United States Patent
Szigeti et al.

(10) Patent No.: US 11,392,115 B2
(45) Date of Patent: Jul. 19, 2022

(54) ZERO-TRUST ARCHITECTURE FOR INDUSTRIAL AUTOMATION

(71) Applicant: Cisco Technology, Inc., San Jose, CA (US)

(72) Inventors: Thomas Szigeti, Vancouver (CA); Robert E. Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 17/077,018

(22) Filed: Oct. 22, 2020

(65) Prior Publication Data
US 2022/0128985 A1 Apr. 28, 2022

(51) Int. Cl.
*G05B 23/02* (2006.01)
*G06N 20/00* (2019.01)
*H04L 43/0817* (2022.01)
*H04L 43/065* (2022.01)

(52) U.S. Cl.
CPC ....... *G05B 23/0256* (2013.01); *G05B 23/024* (2013.01); *G05B 23/0262* (2013.01); *G05B 23/0275* (2013.01); *G06N 20/00* (2019.01); *H04L 43/065* (2013.01); *H04L 43/0817* (2013.01)

(58) Field of Classification Search
CPC .............. G05B 23/0256; G05B 23/024; G05B 23/0262; G05B 23/0275
USPC .......................................................... 700/81
See application file for complete search history.

(56) References Cited

U.S. PATENT DOCUMENTS

| 9,979,606 B2 | 5/2018 | Gupta et al. |
| 2018/0268142 A1 | 9/2018 | Sethumadhavan et al. |
| 2019/0195742 A1* | 6/2019 | Erickson ............ G06K 9/00496 |
| 2019/0207957 A1 | 7/2019 | Espinosa et al. |
| 2020/0267174 A1 | 8/2020 | Soulhi et al. |

OTHER PUBLICATIONS

An Entropy-Based Network Anomaly Detection Method, By: Przemysław Berezinski, Entropy 2015, 17, 2367-2408, ISSN 1099-4300 (Year: 2015).*
Machine Learning Based File Entropy Analysis for Ransomware Detection in Backup Systems, By: Kyungroul Lee, IEEE—date of publication Jul. 25, 2019, date of current version Aug. 22, 2019. (Year: 2019).*

(Continued)

*Primary Examiner* — Jigneshkumar C Patel
(74) *Attorney, Agent, or Firm* — Behmke Innovation Group LLC; Kenneth J. Heywood; Jonathon P. Western

(57) ABSTRACT

According to one or more embodiments of the disclosure, a device in a network obtains parameters for entropy testing of industrial equipment that controls a physical process. Entropy is added to commands sent to the industrial equipment during the entropy testing. The device receives packets that were generated during the entropy testing of the industrial equipment and include sensor data regarding the physical process. The device determines whether the sensor data is inconsistent by analyzing the sensor data using a machine learning model that models the physical process. The device initiates a corrective measure, when the sensor data is determined to be inconsistent.

20 Claims, 10 Drawing Sheets

(56) References Cited

OTHER PUBLICATIONS

Entropy based Intrusion Detection, By: Kenichi Yoshida, IEEE-2003 (Year: 2003).*

Sivanathan, et al., "Detecting Behavioral Change of IoT Devices Using Clustering-Based Network Traffic Modeling", IEEE Internet of Things Journal (vol. 7, Issue: 8, Aug. 2020), pp. 7295-7309, IEEE.

Rahmani, et al. "A Traffic Coherence Analysis Model for DDOS Attack Detection", In Proceedings of the International Conference on Security and Cryptography, Jul. 2009, pp. 148-154, SECRYPT, ICETE.

Xiao, et al., "IoT Security Techniques Based on Machine Learning", IEEE Signal Processing Magazine (vol. 35, Issue: 5, Sep. 2018), pp. 41-49, IEEE.

Mozaffari, et al., "Online Multivariate Anomaly Detection and Localization for High-dimensional Settings", online: https://arxiv.org/pdf/1905.07107.pdf, Jul. 2020, 16 pages, arvix.org.

Kravchik, et al., "Detecting Cyberattacks in Industrial Control Systems Using Convolutional Neural Networks", online: https://arxiv.org/pdf/1806.08110.pdf, Dec. 2018, 12 pages, arvix.org.

* cited by examiner

ZERO-TRUST ARCHITECTURE FOR INDUSTRIAL AUTOMATION

TECHNICAL FIELD

The present disclosure relates generally to computer networks, and, more particularly, to a zero-trust architecture for industrial automation.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The nature of the IoT makes network security particularly challenging, especially in the case of industrial settings, such as factories, mines, ports, power substations, and the like. Indeed, these types of networks are typically large scale in nature, include a variety of legacy devices that do not support authentication methods (e.g., 802.1x) and lack system patching, making it very difficult to define adequate security policies for each device. In addition, certain forms of malware targeted towards industrial networks operate by falsifying data so as to avoid detection. For instance, a replay attack by malware may operate by recording 'normal' data over a period of time and reporting that data later on to conceal malicious activity (e.g., damaging industrial equipment by operating it outside of its safe range, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
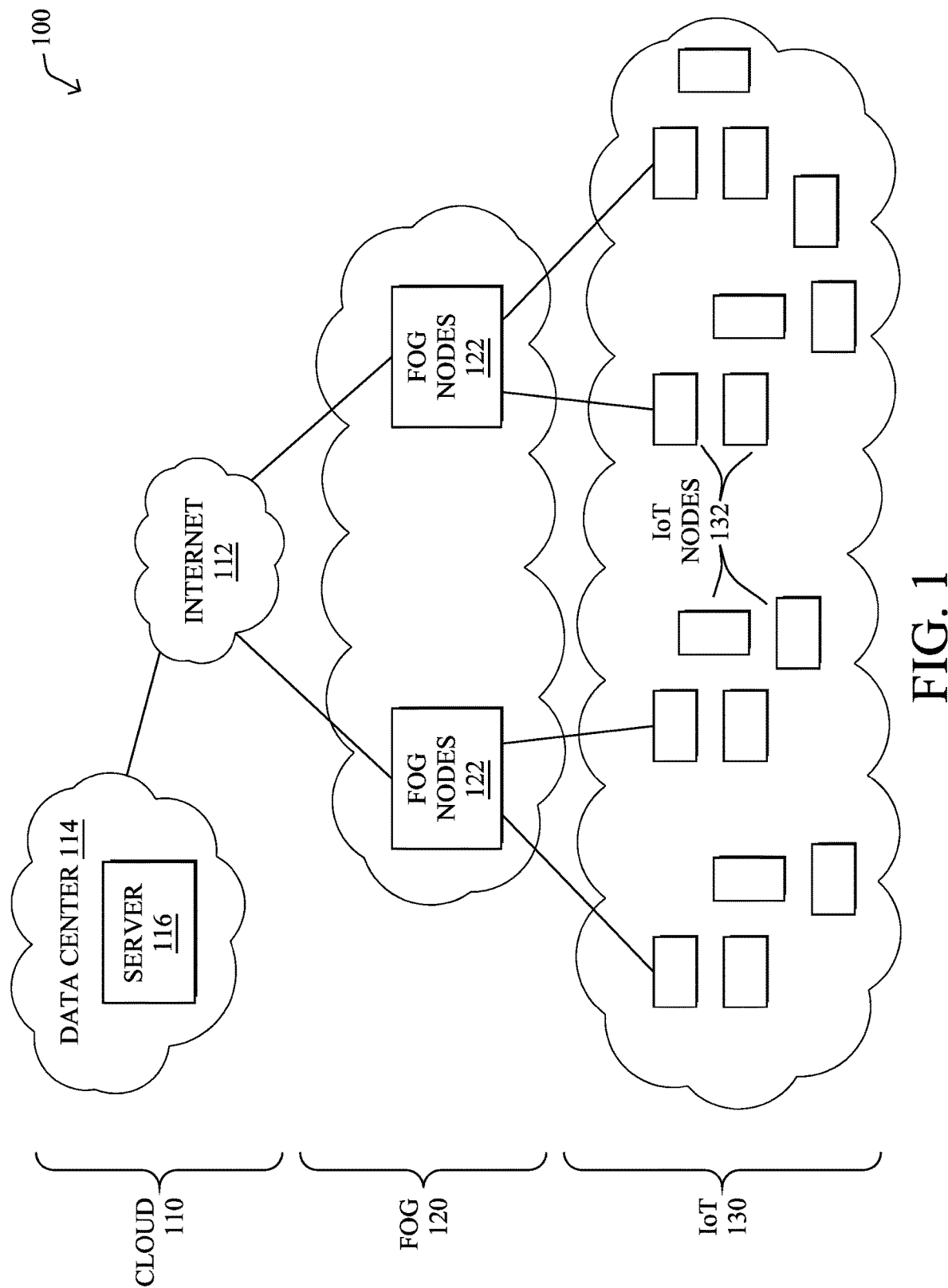
FIG. 1 illustrate an example network.

According to one or more embodiments of the disclosure, a device in a network obtains parameters for entropy testing of industrial equipment that controls a physical process. Entropy is added to commands sent to the industrial equipment during the entropy testing. The device receives packets that were generated during the entropy testing of the industrial equipment and include sensor data regarding the physical process. The device determines whether the sensor data is inconsistent by analyzing the sensor data using a machine learning model that models the physical process. The device initiates a corrective measure, when the sensor data is determined to be inconsistent.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
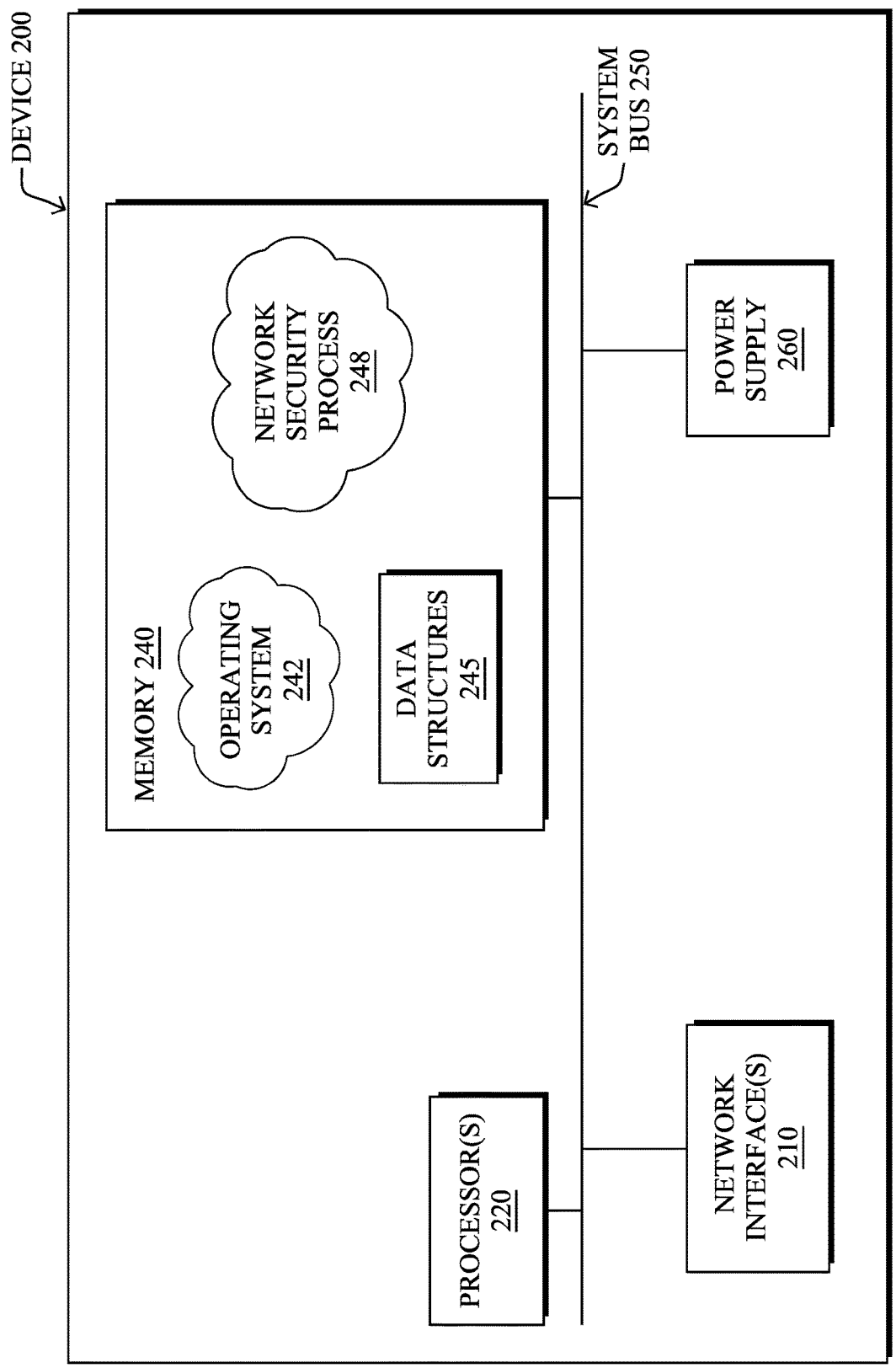
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network interfaces 210, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security process 248 may be configured to perform any or all of the following tasks:
1. Identifying and classifying devices in the network— this may entail, for example, determining the make, model, software configuration, type, etc. of a given device.
2. Discerning operational insights about a device—for example, network security process 248 may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, process 248 may also track variable changes, to monitor the integrity of the industrial workflow.
3. Detecting anomalies—network security process 248 may also assess the behaviors of a device on the network, to determine whether its behaviors are anomalous. In various embodiments, this may entail network security process 248 determining whether the behavior of the device has changed significantly over time and/or does not fit the expected behavioral pattern for its classification. For example, if the device is identifies as being a temperature sensor that periodically sends temperature measurements to a supervisory service, but the device is instead communicating data elsewhere, process 248 may deem this behavior anomalous.

In various embodiments, network security process 248 may employ any number of machine learning techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, network security process 248 can use the model M to classify new data points, such as information regarding new traffic flows in the network. Often, M is a statistical model, and the cost function is inversely proportional to the likelihood of M, given the input data.

In various embodiments, network security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "suspicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security process 248 may assess the captured telemetry data on a per-flow basis. In other embodiments, network security process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, the very nature of the IoT presents certain challenges, from a security standpoint. Indeed, the diversity of the various devices in the network in terms of their hardware, software, and purposes (e.g., sensing, controlling, etc.), as well as the specific configuration of the network (e.g., cells in an industrial network, etc.), can make enforcing network security particularly challenging.

Best practices for Industrial IoT security typically follow standardized models, such as IEC 62443. This security model implements both operational technology (OT) and information technology (IT) security levels and establishes how security should be designed in industrial systems. Furthermore, it describes how security between levels is accomplished through the use of controlled conduits. However, industrial security remains very difficult to enforce, as evidenced by recent industrial attacks where this model was in place. A superior approach would be to leverage intent-based networking, complete with abstraction, automation and analytics, to define, enforce and assure IoT security policies.

It is also important to recognize that IoT devices typically follow a very well prescribed communication profile (e.g., to which devices they should be communicating, on what protocol, and what the protocol should be doing). For instance, a supervisory control and data acquisition (SCADA) slave should only ever communicate to a SCADA master on an established port and should only execute allowable commands. However, it remains very difficult to both 1.) verify that the things, such as intelligent electronic devices, programmable logic controllers (PLCs), variable-frequency drive (VFD), human-machine interfaces (HMIs), input/output (I/O) controllers, etc., are communicating in the expected way and 2.) control their behaviors such that any unexpected network attacks are isolated.

Even when the communications between endpoints are seemingly innocuous, there has been a recent trend in malware taking advantage of these communications to damage equipment. In these forms of attacks, an infected endpoint can send control commands to another endpoint, with whom communication is allowed, that can damage or disrupt the operations of the equipment and, potentially, the industrial environment as a whole. For example, malicious SCADA commands to a PLC could cause the PLC to drive a motor in an unsafe way, cause power to be turned off or on to a circuit (e.g., a feeder in an electrical power station), or the like.

Figure 3:
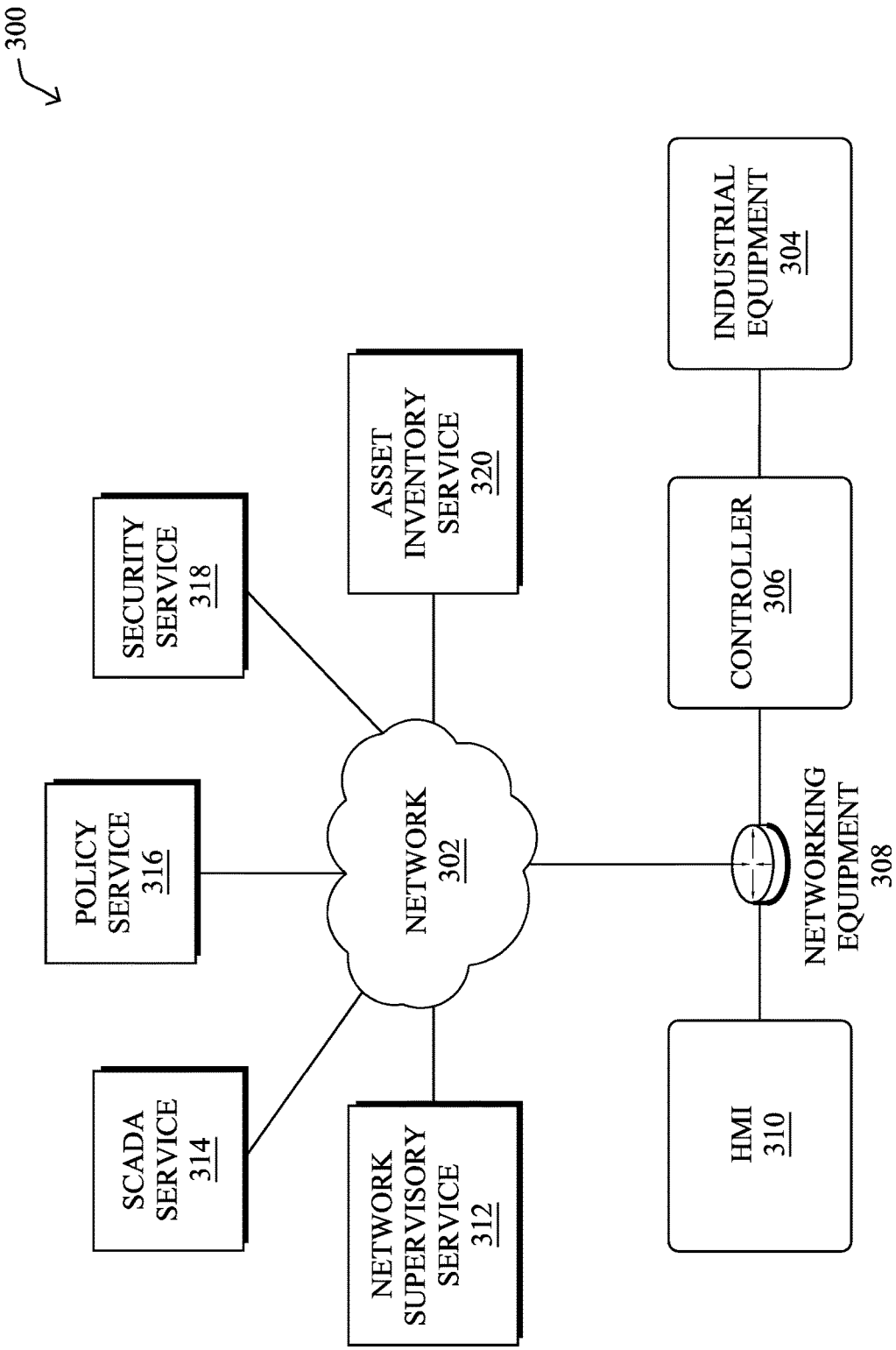
FIG. 3 illustrates an example network architecture for an industrial network.

FIG. 3 illustrates an example network architecture 300 for an industrial network, according to various embodiments. As shown, architecture 300 may include industrial equipment 304 connected to a controller 306, such as a PLC, a VFD, or the like, that controls the operations of industrial equipment 304. In turn, controller 306 for industrial equipment 304 may be connected to an HMI 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation of networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by Cisco Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include SCADA service 314 which supervises the operation of the industrial process. More specifically, SCADA service 314 may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by Cisco Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/endpoints in network 302 and maintain an inventory of these various devices in network 302. In various embodiments, asset inventory service 320 may do so by embedding sensing modules in networking equipment 308 which passively analyze communications between endpoints. The sensors may use deep packet inspection (DPI) to not only identify the protocols in use by a given packet (e.g., the automation protocol used between HMI 310, controller 306, and SCADA service 314), but also understand the action(s) that are being communicated and to classify both the type of device/component and its application behavior.

For example, when a sensor module executed by networking equipment 308 identifies the use of an automation protocol by a packet, it may examine the payload of each flow to identify any or all of the following:
The device type (e.g., based on passive scan of traffic and matching a known criterion, the device is classified).
The software and/or hardware versions of the device.
MAC and IP addresses of all devices with which the discovered device is communicating.
The activity profile of the device (e.g., how is it trying to communicate), and the protocol(s) it is using.
The commands that are being passed (e.g., SCADA commands, etc.), down to the specific control parameter values.

The sensor modules of networking equipment 308 then then organize the collected information into meaningful tags. In general, these tags are simply a way to categorize devices and their behaviors, similar to the same way a human may look at a pen or a pencil and categorize them as writing instruments. Each device can also have multiple tags associated with it, such as the following:
Component Tags—these tags identify device specific details (e.g., Device ID, SCADA station, PLC, Windows device, etc.).
Activity Tags—these tags identify what the device is doing at the protocol level (Programming CPU, Heartbeat, Emergency Break, Data Push).
User-Defined Tags—these could be custom tags to supply additional context (e.g. "Cell 1 Tag").
Dynamically Generated Tags—these could be added dynamically (e.g., using ML) to signify whether the behavior of the device is normal or anomalous, or for other dynamic conditions.
Scalable Group Tags—These tags are applied to specific packet flows between a defined group of devices/services in the network. For example, in the case shown, HMI 310, controller 306, and SCADA service 314 may be tagged as belonging to a particular group.

The sensor modules embedded in networking equipment 308 may also collect metadata about the communicating devices/endpoints, including its network identifiers (e.g., IP and MAC addresses), vendor, device-type, firmware version, the switch ID and port where the device is connected, etc. As the sensor module learns details of a new device/endpoint in network 302, it may send its collected metadata about that device, along with its tags, to the asset inventory service 320.

In this manner, asset inventory service 320 may maintain an inventory of each of the endpoint devices in network 302, their associated tags, and their metadata. Thus, as new devices are discovered in network 302, their profile information is added to the live inventory of devices maintained by asset inventory service 320. As noted above, the various tags applied by the sensor modules deployed to networking equipment 308 and used by asset inventory service 320 may be predefined or may, via a user interface (not show) be user-defined.

As noted above, IoT devices are often insecure and easily compromised by malware. One approach to concealing the presence of malware is to trick the operator by sending back false information of a device that has been hijacked, such as controller 306 for industrial equipment 304. This can take the form of either or both of the following actions:
False positive action: no command is given to the infected device, but the infected device still takes an action.
For instance, controller 306 may cause a turbine to spin (e.g., industrial equipment 304), even though no supervisory station (e.g., HMI 310 or SCADA service 314) has issued a control command to do so.
False negative action: a command is given to the infected device to take an action, but the infected device does not do so.

For instance, controller 306 may receive a control command to make the turbine stop (e.g., industrial equipment 304), but continues to allow the turbine to spin unabated.

Certain forms of malware in IoT networks may also report false information, to conceal its presence. This can take the form of either or both of the following:

False positive feedback: the infected device reports an event/condition that is not actually occurring/present.

For instance, controller 306 may report to HMI 310 and/or SCADA service 314 that pressure valves (e.g., industrial equipment 304) that it has opened the valves to remove pressure, but the pressure valves actually remain shut. In some instances, controller 306 may also report false pressure reading, as well.

False negative feedback: the infected device does not report an event/condition that is occurring/present.

For instance, assume that industrial equipment 304 includes pressure valves controlled by controller 306. If controller 306 is infected, it may fail to raise an alarm when the pressure readings are at dangerous levels.

Note that malware may infect any of the various devices that participate in a control loop, such as industrial equipment 304, controller 306, HMI 310, or the like. Once infected, such a device may take any of the above actions, such as issuing unauthorized control commands and/or falsifying data reported to control systems, such as SCADA service 314.

One famous example of industrial malware is Stuxnet, which acted both as a 'man-in-the-middle' by intercepting commands and generating false responses, but also employed a replay mechanism to conceal its presence. More specifically, one of the first steps Stuxnet undertook was to 'record' normal operational data from the devices under its control over an extended period (such as 2 weeks) and then later replay this 'normal' data while executing damaging attacks. This tactic is similar to bank robbers who record extended video surveillance of normal events and then replay and loop this footage to the video surveillance systems while executing a robbery, so as to fool any who may be watching the video feeds. It also bears noting that most network traffic in industrial and IoT settings remains unencrypted, today, making it highly susceptible to these forms of attack, including man-in-the-middle manipulations of protocol commands and responses.

Unfortunately, communications in industrial and IoT networks are still often implicitly trusted, even though their source devices may potentially be compromised by malware. This leads to situations in which the malware could cause damage to industrial equipment (e.g., by operating the equipment outside of its intended range), harm the industrial process, and/or lead to bodily injury of workers.

Zero-Trust Architecture for Industrial Automation

The techniques herein introduce a zero-trust architecture for industrial automation environments. In some aspects, the techniques herein require quantitative proof of system integrity by leveraging machine learning and/or correlation analysis with entropy testing. More specifically, in some aspects, the techniques herein can be used to introduce entropy into a control loop to test whether a particular device is operating normally or has been compromised by malware.

Illustratively, the techniques described herein may be performed by hardware, software, and/or firmware, such as in accordance with the network security process 248, which may include computer executable instructions executed by the processor 220 (or independent processor of interfaces 210) to perform functions relating to the techniques described herein.

Specifically, according to various embodiments, a device in a network obtains parameters for entropy testing of industrial equipment that controls a physical process. Entropy is added to commands sent to the industrial equipment during the entropy testing. The device receives packets that were generated during the entropy testing of the industrial equipment and include sensor data regarding the physical process. The device determines whether the sensor data is inconsistent by analyzing the sensor data using a machine learning model that models the physical process. The device initiates a corrective measure, when the sensor data is determined to be inconsistent.

Operationally, the zero-trust architecture introduced herein proposes the use of any or all of the following:

1. Data Verification Using Machine Learning
2. Entropy Analysis
3. Entropy-Induction and Closed-Loop Observation In some embodiments, the techniques herein propose using a 'trust-but-verify' approach for IoT devices and the applications they run by leveraging machine learning. For instance, as shown in FIG. 3, security service 318 may be configured to use machine learning as part of its security functionality within architecture 300 (e.g., through execution of network security process 248).

More specifically, the techniques herein propose evaluating the correlations between key performance indicators (KPIs) as a form of verification of trust. With this approach, security sensors embedded onto networking equipment 308 may analyze data regarding the physical process being performed by industrial equipment 304, such as the control parameters used by industrial equipment 304 and any sensor measurement captured by industrial equipment 304. Indeed, certain variable types are likely to have a high level of correlation. For example, the faster a motor spins, the more the motor will vibrate, and the temperature will increase.

In various embodiments, machine learning can be applied to the multidimensional dataset regarding the physical process being controlled, to determine which variables are highly correlated. Example approaches to achieve this may include, but are not limited to, calculating Pearson's correlation for linearly related parameters or Spearman's correlation for nonlinear relationship between variables, to identify correlated variables and, potentially, how they are related (e.g., linearly or not).

In turn, principal component analysis (PCA) may be applied here to determine the co-variance (degree of correlation) of correlated variables, as well as generally reducing the variable count to the most significant ones. This allows the machine learning engine to analyze the set of data with highest expected level of correlation between variables. Using PCA, the highly correlated variables are defined in a new dimensional space called Eigenvectors. Note that the dimensions with a high degree of correlation (e.g., having a positive co-variance) are expected to continue demonstrating this behavior. By continually analyzing the behavior of these dimensions, any exhibited divergence such as beginning to demonstrate a negative co-variance will indicate an unexpected problem.

Said differently, correlated variables related to a physical process are often consistent in their correlations. This fact can be leveraged by security service 318 to identify cases in which the relationships between the variables are inconsistent and, therefore, suspicious from a security standpoint.

Indeed, such conditions may very well be caused by malware attempting to conceal itself in the network by misreporting sensor data and/or operating equipment not in accordance with its control commands.

In some embodiments, data from the top-n principal components (e.g., the PCA eigenvectors) may then be collected and a machine learning-based clustering algorithm can be used to identify the cluster boundaries. Unsupervised clustering approaches such as DBSCAN or K-Means may be well suited for this task, although other clustering approaches can also be used. After enough training, cluster boundaries of the top-n principal components will be established, and the dimension of the variable matrix provides the count of variables that are significant and correlated. Similarly, the value of the eigenvalues computed on the variable sub-matrices reveals the level of correlation (e.g., a large eigenvalue reveals a strong correlation).

Using the above information, security service 318 may train a machine learning-based classifier to determine whether the observed variation in eigenvectors is normal or abnormal (e.g., consistent with the model or inconsistent), in some embodiments. For instance, the classifier may take the form of a Naïve Bayes classifier that assesses the variations in eigenvectors. In one embodiment, such a classifier may be deployed to one or more of networking equipment 308 (e.g., at the edge of the network, etc.), to assess the variables associated with the physical process being controlled by industrial equipment 304.

The executing device may use the trained classifier to identify when correlated variables are aligning as expected. In other words, the classifier may act as a verification engine which continually observes when reported sensor data (e.g., one or more KPIs) varies significantly from the correlated variables being watched. In essence, it is highly suspicious when the correlation of the PCA eigenvectors no longer follows predictable expectations (the measured co-variance changes). When the Eigenvectors vary enough that correlation computation one their underlying variables shows that they are no longer correlated, this strongly implies that the system is no longer functioning as expected, even if the information reported to SCADA service 314 indicates that it is.

By way of example, consider the case in which controller 306 is a PLC and industrial equipment 304 is a turbine controlled by controller 306. Assume that controller 306 has been programmed to spin the turbine at 1,000 revolutions per minute (rpms), which is the KPI reported by controller 306 to SCADA service 314. Now, also assume that controller 306 has become compromised by malware that does the following:
1. Instruct the turbine to spin at 5,000 rpms (e.g., five-times the normal speed).
2. Falsely report to SCADA service 314 and/or HMI 310 that the turbine is still spinning at only 1,000 RPM.
3. When explicitly queried by an operator for the speed at which the turbine is spinning, intercept the query and falsely report that it is still spinning only at 1,000 RPM.

Figure 4:
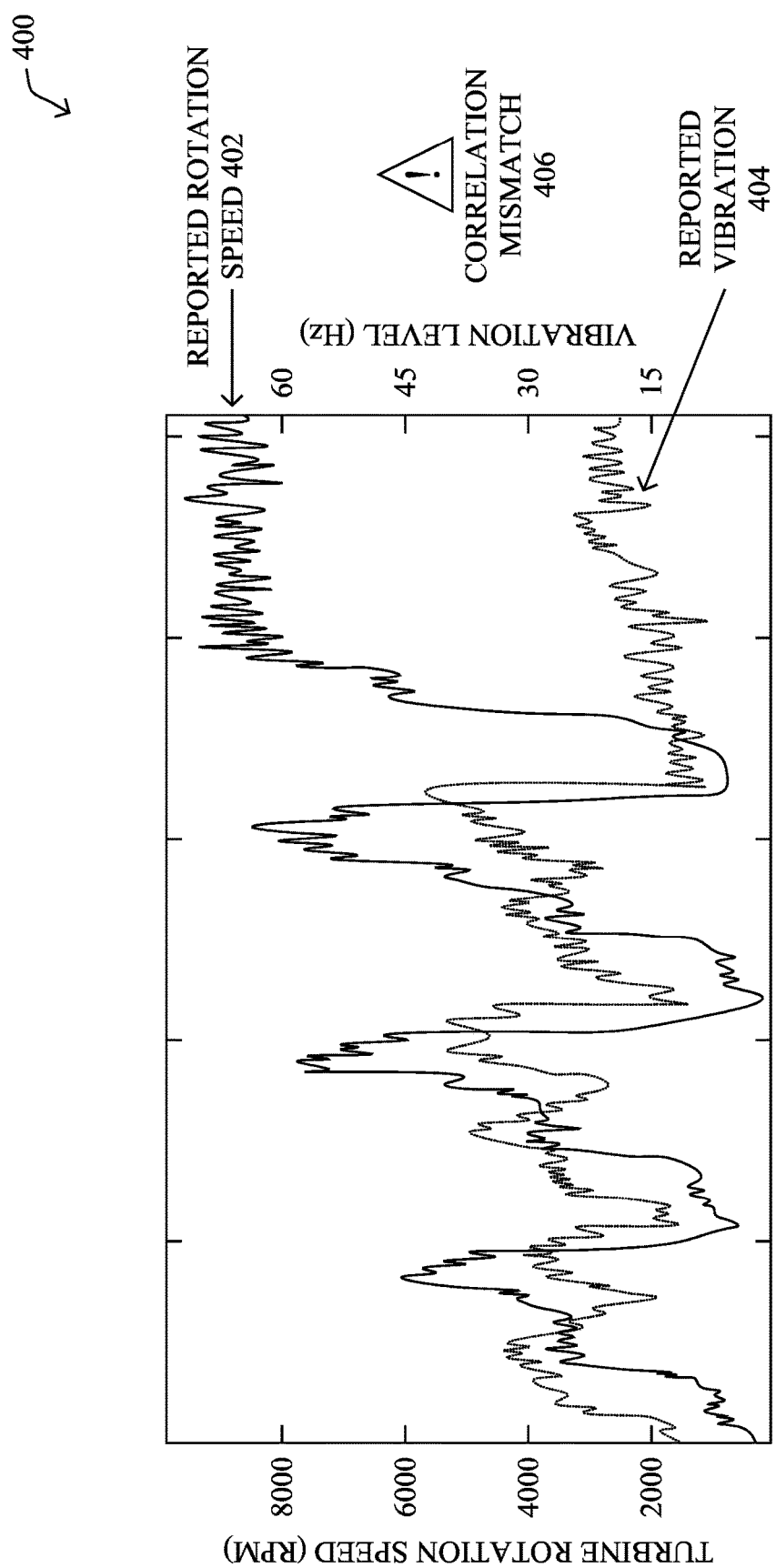
FIG. 4 illustrates an example plot of data variables associated with a physical process.

For example, FIG. 4 illustrates an example plot 400 of some of the variables associated with operating a turbine. More specifically, plot 400 shows the reported rotation speed 402 for a turbine in rpms over time, as well as the reported vibration 404 measured in Hz for the turbine. As can be seen, rotation speed 402 and vibration 404 are typically correlated, with the vibration typically increasing with the rotation speed of the turbine. However, at a certain point in time, this correlation begins to break down and the correlation is no longer consistent with what is expected. More specifically, rotation speed 402 continues to increase while vibration 404 remains low. In such a case, the machine learning engine can identify this correlation mismatch 406 and raise an alert.

Referring again to FIG. 3, detection of the malware can be achieved by assessing the correlated variables related to the physical process. For instance, this may entail querying for the following variables, assuming these have all been previously identified as correlating to turbine rotation speed:
  Asking what the current temperature is, as higher rotation speeds could be indicative of higher rotation speeds.
  Asking what the current vibration-levels are, as higher vibration-levels could be indicative of higher rotation speeds.
  Asking what the current power-draw is, as higher power-draws could be indicative of higher rotation speeds.
  Etc.

If hardware or software sensors are situated on the relevant network links and configured to perform DPI on the passing traffic, they can uncover the deception by the malware by comparing and contrasting the commands send to the industrial equipment 304 and the data reported back to SCADA service 314. For instance, in the previous example of a turbine, comparing the control commands sent via the PLC-turbine link (e.g., the command to spin at 5,000 rpms) and the reported state of the turbine on the PLC-SCADA link (e.g., reporting the turbine as spinning at 1,000 rpms) can uncover the discrepancy and the presence of malware on controller 306. However, this approach assumes that the traffic involved is unencrypted, which may not always be the case. In addition, this approach would also not detect malware installed directly on industrial equipment 304, since there would not be two sets of DPI reports to compare and contrast with one another.

In contrast, the multivariate correlation analysis introduced herein may be able to verify whether a particular IoT device is trusted (e.g., that the top n-number of Eigenvectors remain consistent), regardless of the data collection point in the network. Indeed, if significant deviations are observed between correlated variables, then the trust of the IoT device (or intermediate device) may begin to weaken until enough quantifiable evidence is produced to indicate that trust is compromised. When this occurs, the analyzing device may initiate a corrective measure, such as sending an alert to a user interface and/or shutting down the physical process until forensic analysis can be performed.

In further embodiments, the machine learning engine may analyze the entropy (e.g., the randomness) of the reported data, to help determine whether malware has infiltrated the network. Preferably, this is performed in combination with the analysis of the KPI correlations described above. As would be appreciated, entropy is abundant and omnipresent in the physical world, even in operational environments that are highly automated. For example, temperatures will vary slightly, even with environmental controls in place. The same is true for turbine speeds, pressures, etc. Even the most precise atomic clocks have a degree of drift, albeit infinitesimal. Entropy is simply an innate characteristic of our physical world.

In some embodiments, the machine learning engine used by the analyzing device may be trained to learn the degree of 'normal' entropy present during operation of the physical process. For instance, perhaps the temperature of an environment is set to 20 degrees Celsius but actually varies from 18 to 22 degrees Celsius. In another example, maybe the turbine speed set to 1,000 rpm is noted to vary between 996 and 1005 rpm. In yet another example, a valve may be set to release pressure at 100 pounds per square inch (PSI), but actually opens anywhere between 97 PSI and 102 PSI.

By assessing the entropy associated with the physical process, the device may identify potential problems such as the presence of malware that is reporting values that are too constant and not consistent with the expected entropy of the physical process. For instance, if the reported rotational speed of a turbine is 1,000 rpm, without any variation at all, this may be an indication that the degree of accuracy of the measurement and/or the authenticity of the reported value is suspect. Indeed, some malware may attempt to intercept queries for a specific variable and reply with a pre-programmed, and constant, false answer.

In various embodiments, another potential way to identify evasive malware in the network is perform entropy testing of the physical process being controlled. While the correlation analysis and entropy analysis approaches above can effectively identify man-in-the-middle malware attacks that are falsifying data, such approaches may not be able to positively identify replay attacks in which pre-recorded data from 'normal' operations are reported back, to mask an ongoing attack. For this type of advanced attack, a different approach is needed, as the operations that have been previously recorded will display normal correlations between KPIs, as well as normal entropy.

FIGS. 5A-5E illustrate examples of using entropy testing, according to various embodiments. As shown in FIG. 5A, again consider network architecture 300 in which industrial equipment 304 controls a physical process. Thus, control traffic 502 may be exchanged between SCADA service 314, HMI 310, controller 306, and/or industrial equipment 304 via networking equipment 308. For instance, various control commands may be sent from HMI 310 or SCADA service 314 to controller 306, which controls the operation of industrial equipment 304. Similarly, control traffic 502 may also convey sensor measurements or other data regarding the physical process from industrial equipment 304 and/or controller 306 to HMI 310 and/or SCADA service 314.

Figure 5A:
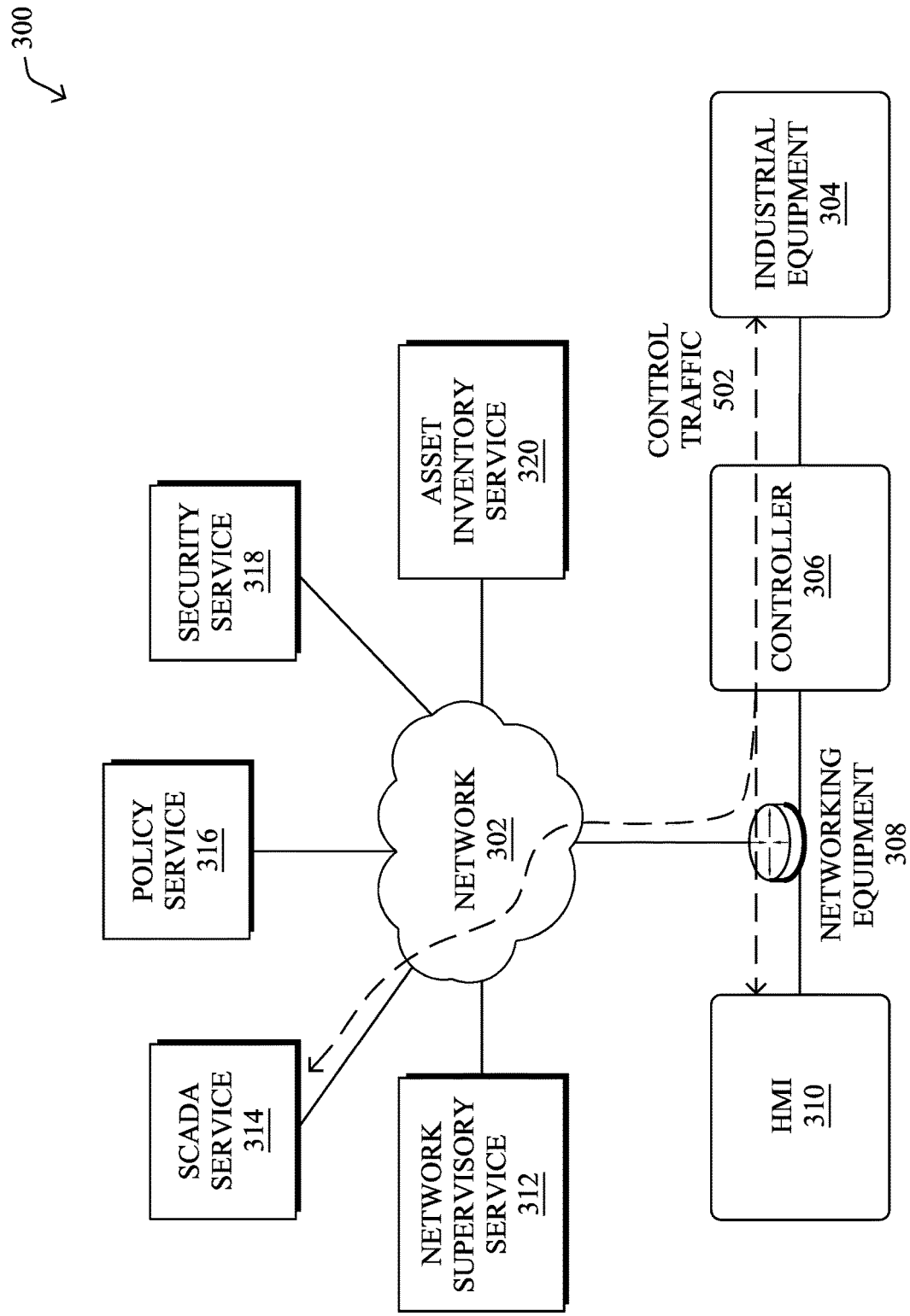
FIGS. 5A-5E illustrate examples of using entropy testing in an industrial network.
Figure 5B:
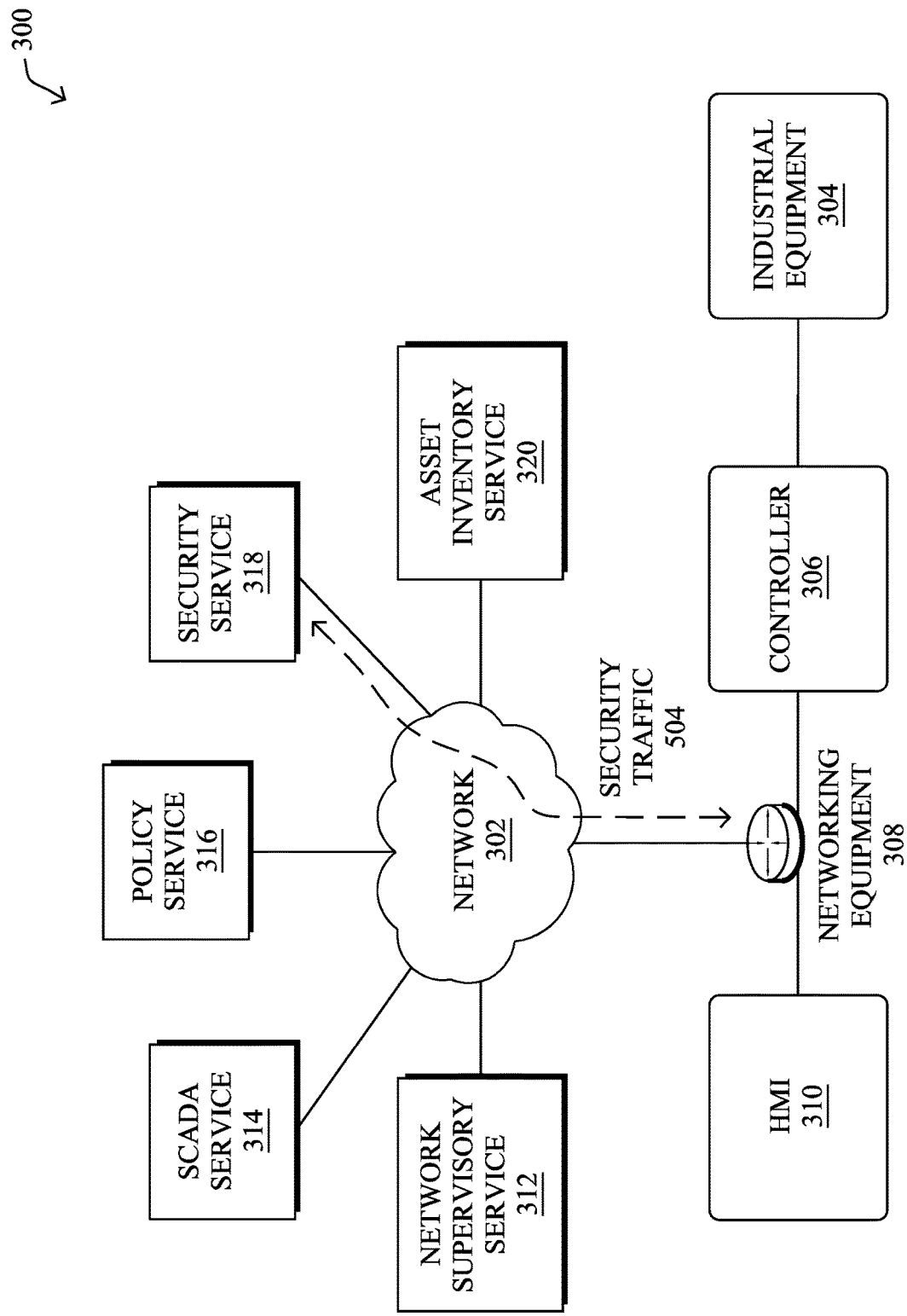

As shown in FIG. 5B, another function within architecture 300 may entail networking equipment 308 assessing packets that traverse them. Accordingly, networking equipment 308 may exchange security traffic 504 with security service 318, such as raw packet captures, DPI reports, local security assessments, or the like.

Figure 5C:
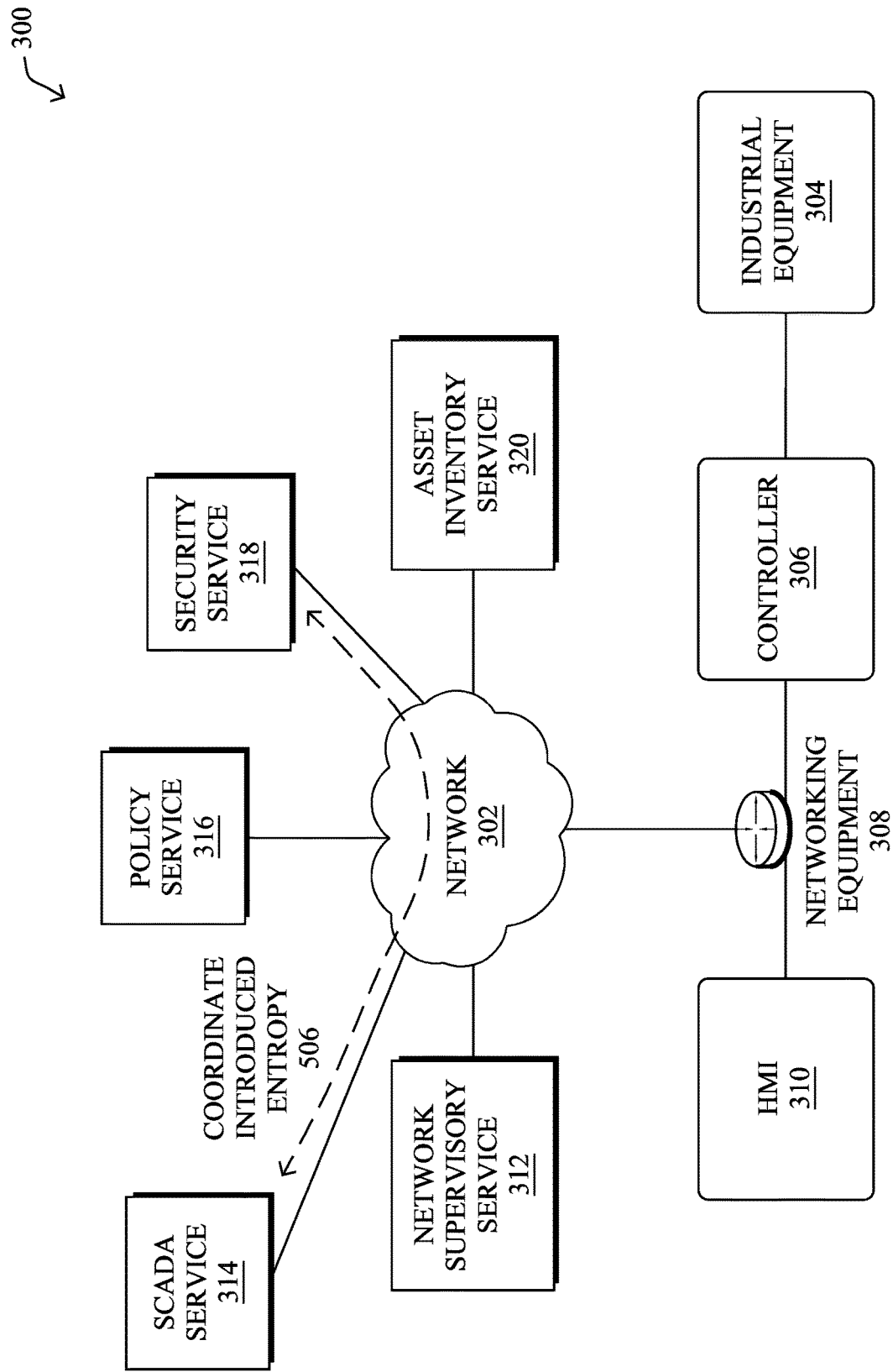

In FIG. 5C, security service 318 and SCADA service 314 may exchange messages 506 to coordinate the introduction of entropy into the physical process controlled by industrial equipment 304. For instance, SCADA service 314 and security service 318 may communicate over a secure and encrypted channel for out-of-band communications, to coordinate the performance of an entropy test. The parameters of the test may also be pushed to networking equipment 308, in some instances, so that networking equipment 308 can aid in the evaluation of the testing. During an entropy test, entropy is introduced in a limited manner into the physical process, to assess the results reported regarding the process.

The start of an entropy test may be selected on-demand, periodically, selected randomly, or in response to the correlation analysis or entropy analysis mechanism described previously raising suspicion of malware being present, in various embodiments. For instance, if security service 318 suspects the presence of malware based on the correlations of KPIs not being consistent or the entropy of the system being too predictable, security service 318 may coordinate an entropy test with SCADA service 314, to further investigate.

Figure 5D:
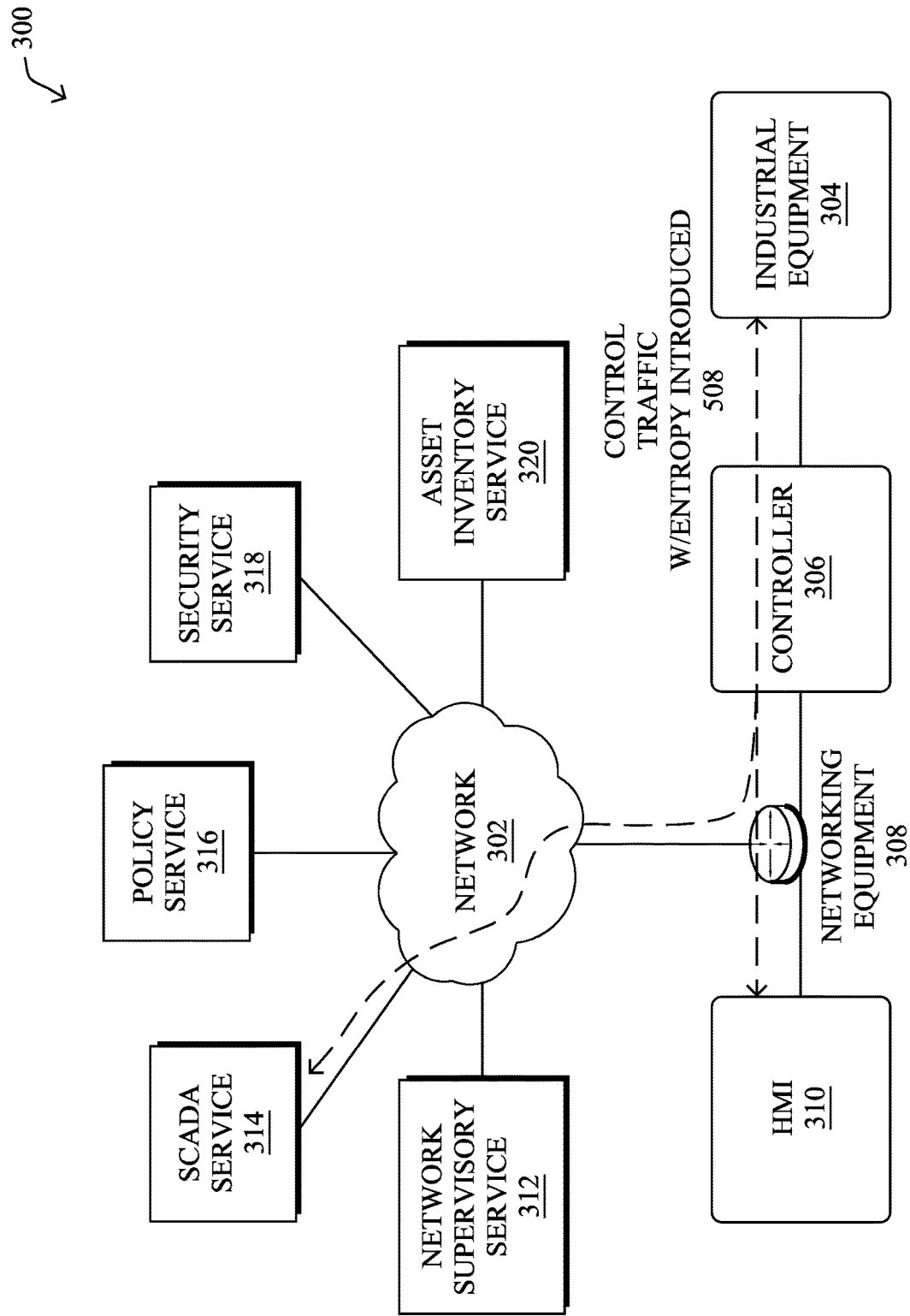

As shown in FIG. 5D, the entropy test will result in control traffic 508 being generated. For instance, control traffic 508 may comprise control commands that cause industrial equipment 304 to vary its operation so as to introduce additional entropy into the physical process, sensor data regarding the physical process during the entropy test, and the like.

By way of example of the purposeful introduction of entropy into the physical process, again consider the case in which industrial equipment 304 includes a turbine. In such a case, the introduced entropy may take the form of a control command to raise the rpm of the turbine by 5 rpm for ten seconds. Depending on the specific type of industrial equipment 304, other examples of control commands to introduce entropy may entail lowering the temperature of the environment by two degrees for one minute, raising the pressure by 3 PSI for five seconds, etc. Whatever the type of entropy to be introduced, SCADA service 314 and security service 318 may select it to be within normal operational ranges and safety tolerances of industrial equipment 304, in various embodiments.

Figure 5E:
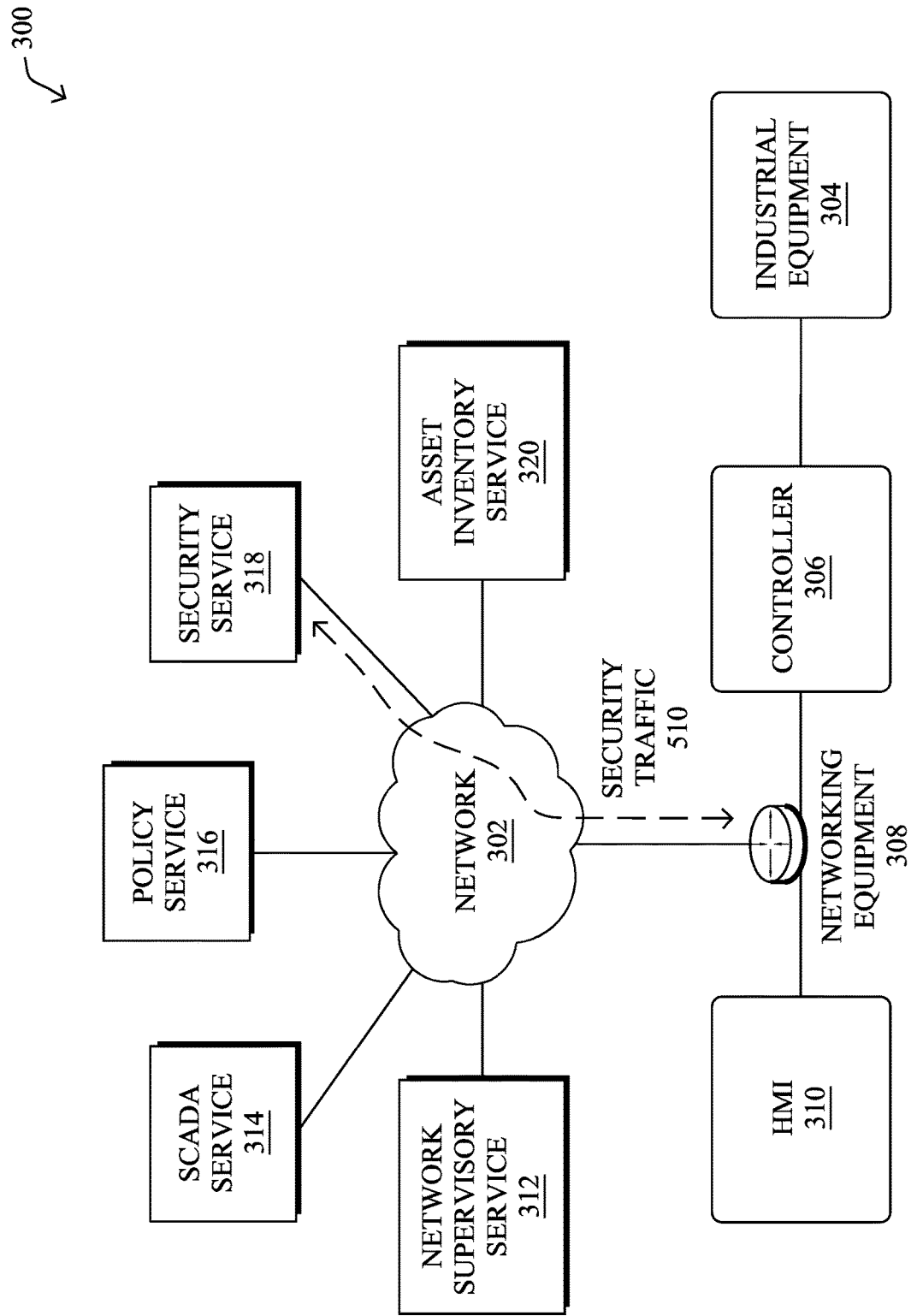

In FIG. 5E, networking equipment 308 may capture and assess the packets of control traffic 508 associated with the entropy test, to determine whether the reported sensor data is inconsistent with the injected entropy. For instance, networking equipment 308 may perform DPI to extract the sensor data from the packets bound for SCADA service 314 regarding the physical process. In turn, networking equipment 308 may forward the sensor data, or the raw packets that were captured, to security service 318 via security traffic 510. This allows security service 318 to determine whether the reported sensor data is consistent with what is expected from the physical process in view of the introduced entropy.

As would be appreciated, security service 318 may be a remote service to that of networking equipment 308 or hosted at least in part on the capturing device, thereby allowing the device to make a local assessment. For instance, a machine learning model that has been trained to model the behavior of the physical process under different conditions may be deployed to a particular device in networking equipment 308. In turn, that device may use the model to assess the sensor data that it captures, to determine whether there are indications of compromise. Security traffic 510 may also convey to security service 318 any results of a local security assessment, so that corrective measures can be taken when the response of the physical process is inconsistent with the introduced entropy. For instance, By way of another example, consider the case of a robot in industrial equipment 304 that has three seconds to return to its starting position, but it only takes half-a-second to do so. Instead of triggering the reset to the starting position immediately after the completion of a given operation, the signal could be delayed by a second (for the sake of inducing entropy). The robot is still ready to perform the next operation, as normal, but this subtle variation in expected behavior would provide a valuable insight into the trustworthiness of the system. If the sensor data indicates that the robot did indeed wait the unexpected second before resetting, then the system may be deemed trusted. However, if the data indicates that the robot did not wait the additional second, as would be the case in a replay attack, then this could be considered evidence of the system being compromised and corrective measures initiated such as quarantining the infected equipment 304 and/or its controller 306, shutting down the physical process, alerting, initiating forensic analysis, or the like.

Figure 6:
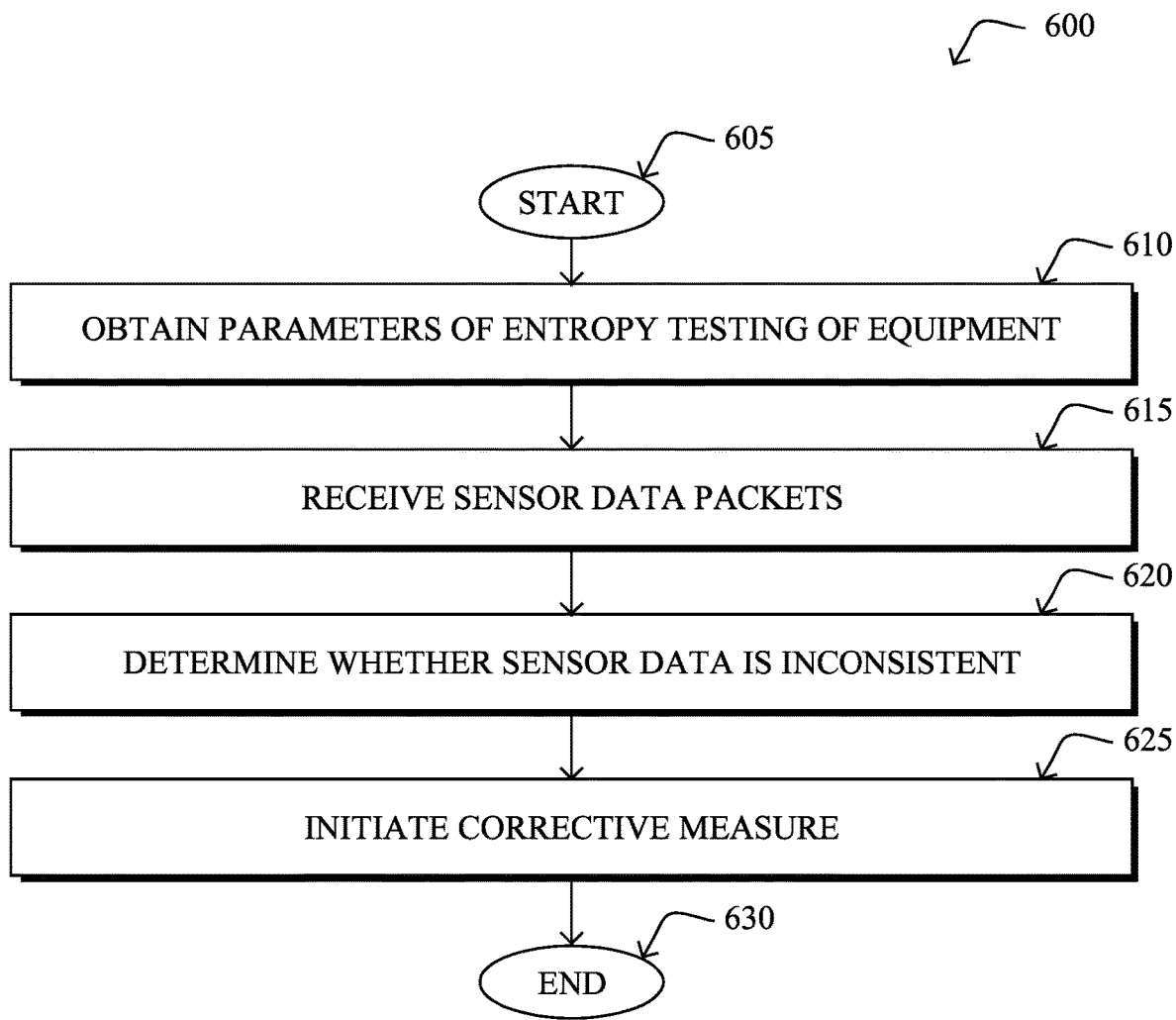
FIG. 6 illustrates an example simplified procedure for assessing an entropy test of industrial equipment.

FIG. 6 illustrates an example simplified procedure for assessing an entropy test of industrial equipment, in accordance with one or more embodiments described herein. In various embodiments, a non-generic, specifically configured device (e.g., device 200) may perform procedure 600 by executing stored instructions (e.g., process 248), such as a networking device in a network. For instance, a network switch, a router, or other form of networking equipment may perform procedure 600, or a server in communication therewith. The procedure 600 may start at step 605, and continues to step 610, where, as described in greater detail above, the device may obtain parameters for entropy testing of industrial equipment that controls a physical process. In various embodiments, entropy is added to commands sent to the industrial equipment during the entropy testing. For instance, such parameters may be indicative of a start time for the entropy testing, commands sent to the industrial equipment during the entropy testing, or the like.

At step 615, as detailed above, the device may receive packets that were generated during the entropy testing of the industrial equipment and include sensor data regarding the physical process. In some embodiments, the device may extract the sensor data from the packets by performing deep packet inspection (DPI) of the packets. Examples of sensor data may include, but are not limited to, measurements such as temperature, pressure, vibration, or the like.

At step 620, the device may determine whether the sensor data is inconsistent by analyzing the sensor data using a machine learning model that models the physical process, as described in greater detail above. In general, the device may do so by evaluating whether the reported sensor data regarding the process is consistent with the entropy introduced during the entropy testing. If not, this is a strong indicator that malware is present in the network and attempting to conceal itself from detection. In some embodiments, such a model may also comprise a cluster-based classifier and/or may be trained in part by using PCA to identify correlated variables associated with the physical process. This allows the device to also assess whether correlated variables continue to exhibit their expected correlations or are deviating from their expected behaviors.

At step 625, as detailed above, the device may initiate a corrective measure, when the sensor data is determined to be inconsistent. For instance, the device may shut down the physical process, send an alert to a user interface, or take other measures to mitigate the effects of any suspected malware that may be trying to conceal itself in the network. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an architecture to verify trust in industrial automation environments. In some aspects, the techniques herein are able to identify the presence of evasive malware by evaluating the correlations between variables associated with a controlled physical process, evaluating the entropy of the physical process, and/or by measuring the response of the process when controlled entropy is injected.

While there have been shown and described illustrative embodiments for a zero-trust architecture for industrial automation, it is to be understood that various other adaptations and modifications may be made within the intent and scope of the embodiments herein. For example, while specific endpoint device types are described, the techniques can be applied to any number of different types of devices. Further, while the techniques herein are described as being performed at certain locations within a network, the techniques herein could also be performed at other locations, as desired (e.g., fully in the cloud, fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
obtaining, by a device in a network, parameters for entropy testing of industrial equipment that controls a physical process, wherein entropy is added to commands sent to the industrial equipment during the entropy testing;
receiving, at the device, packets that were generated during the entropy testing of the industrial equipment and include sensor data regarding the physical process;
determining, by the device, whether the sensor data is inconsistent by analyzing the sensor data using a machine learning model that models the physical process; and
initiating, by the device, a corrective measure, when the sensor data is determined to be inconsistent.

2. The method as in claim 1, wherein the corrective measure comprises shutting down the physical process or sending an alert to a user interface.

3. The method as in claim 1, further comprising:
extracting, by the device, the sensor data from the packets by performing deep packet inspection of the packets.

4. The method as in claim 1, wherein the device comprises a router or network switch.

5. The method as in claim 1, wherein the parameters for the entropy testing are indicative of a start time for the entropy testing and the commands sent to the industrial equipment during the entropy testing.

6. The method as in claim 1, wherein the machine learning model comprises a cluster-based classifier.

7. The method as in claim 1, wherein the machine learning model is trained in part by using principal component analysis to identify correlated variables associated with the physical process.

8. The method as in claim 1, wherein the sensor data regarding the physical process is indicative of at least one of: a temperature measurement, a pressure measurement, or a vibration measurement.

9. The method as in claim 1, wherein a start time for the entropy testing is selected randomly by a security service for the network.

10. The method as in claim 1, wherein the entropy added to the commands sent to the industrial equipment during the entropy testing is selected based in part on a safe operating range for the industrial equipment.

11. An apparatus, comprising:
one or more network interfaces to communicate with a network;
a processor coupled to the one or more network interfaces and configured to execute one or more processes; and
a memory configured to store a process that is executable by the processor, the process when executed configured to:
obtain parameters for entropy testing of industrial equipment that controls a physical process, wherein entropy is added to commands sent to the industrial equipment during the entropy testing;
receive packets that were generated during the entropy testing of the industrial equipment and include sensor data regarding the physical process;
determine whether the sensor data is inconsistent by analyzing the sensor data using a machine learning model that models the physical process; and
initiate a corrective measure, when the sensor data is determined to be inconsistent.

12. The apparatus as in claim 11, wherein the corrective measure comprises shutting down the physical process or sending an alert to a user interface.

13. The apparatus as in claim 11, wherein the process when executed is further configured to:
extract the sensor data from the packets by performing deep packet inspection of the packets.

14. The apparatus as in claim 11, wherein the apparatus comprises a router or network switch.

15. The apparatus as in claim 11, wherein the parameters for the entropy testing are indicative of a start time for the entropy testing and the commands sent to the industrial equipment during the entropy testing.

16. The apparatus as in claim 11, wherein the machine learning model comprises a cluster-based classifier.

17. The apparatus as in claim 11, wherein the sensor data regarding the physical process is indicative of at least one of: a temperature measurement, a pressure measurement, or a vibration measurement.

18. The apparatus as in claim 11, wherein a start time for the entropy testing is selected randomly by a security service for the network.

19. The apparatus as in claim 11, wherein the entropy added to the commands sent to the industrial equipment during the entropy testing is selected based in part on a safe operating range for the industrial equipment.

20. A tangible, non-transitory, computer-readable medium storing program instructions that cause a device in a network to execute a process comprising:
obtaining, by the device in the network, parameters for entropy testing of industrial equipment that controls a physical process, wherein entropy is added to commands sent to the industrial equipment during the entropy testing;
receiving, at the device, packets that were generated during the entropy testing of the industrial equipment and include sensor data regarding the physical process;
determining, by the device, whether the sensor data is inconsistent by analyzing the sensor data using a machine learning model that models the physical process; and
initiating, by the device, a corrective measure, when the sensor data is determined to be inconsistent.

\* \* \* \* \*